US006853728B1

(12) United States Patent
Kahn et al.

(10) Patent No.: US 6,853,728 B1
(45) Date of Patent: Feb. 8, 2005

(54) VIDEO ON DEMAND PAY PER VIEW SERVICES WITH UNMODIFIED CONDITIONAL ACCESS FUNCTIONALITY

(75) Inventors: Raynold M. Kahn, Los Angeles, CA (US); Gregory J. Gagnon, Torrance, CA (US); David D. Ha, San Gabriel, CA (US); Peter M. Klauss, Torrance, CA (US); Christopher P. Curren, Brentwood, CA (US); Thomas H. James, Pacific Palisades, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 598 days.

(21) Appl. No.: 09/620,832

(22) Filed: Jul. 21, 2000

(51) Int. Cl.[7] .............................................. H04W 7/167
(52) U.S. Cl. ...................... 380/239; 380/210; 380/201; 725/25; 725/31; 386/94
(58) Field of Search ............................... 725/25, 31, 2, 725/55, 87–89, 102, 104; 386/94, 12; 380/281, 284, 210, 239, 201, 203, 277; 713/182

(56) References Cited

U.S. PATENT DOCUMENTS

| | | | |
|---|---|---|---|
| 4,613,901 A | * | 9/1986 | Gilhousen et al. .......... 380/239 |
| 5,168,353 A | | 12/1992 | Walker et al. |
| 5,357,276 A | | 10/1994 | Banker et al. |
| 5,371,551 A | | 12/1994 | Logan et al. |
| 5,386,587 A | | 1/1995 | Yuzawa |
| 5,396,293 A | | 3/1995 | Shellard |
| 5,438,423 A | | 8/1995 | Lynch et al. |
| 5,557,541 A | | 9/1996 | Schulhof et al. |
| 5,583,937 A | | 12/1996 | Ullrich et al. |
| 5,592,551 A | | 1/1997 | Lett et al. |
| 5,642,418 A | | 6/1997 | Farris et al. |
| 5,663,896 A | | 9/1997 | Aucsmith |
| 5,677,895 A | | 10/1997 | Mankovitz |
| 5,701,383 A | | 12/1997 | Russo et al. |
| 5,710,970 A | | 1/1998 | Walters et al. |

(List continued on next page.)

FOREIGN PATENT DOCUMENTS

| | | |
|---|---|---|
| EP | 0 975 165 A2 | 7/1995 |
| EP | 0 989 557 A1 | 1/1999 |
| EP | 0 936 812 A1 | 8/1999 |
| JP | 06351023 A | 12/1994 |
| JP | 11136708 A | 5/1999 |
| WO | WO 92/11713 | 7/1992 |
| WO | WO 00/13412 | 3/2000 |
| WO | WO00/19294 | 4/2000 |

OTHER PUBLICATIONS $1^{st}$ Report of EBU / SMPTE Task Force for Harmonized Standards for the Exchange of Television Program Material as Bit Streams, May 6, 1997, Version 1.30, pp. 1–73.

(List continued on next page.)

*Primary Examiner*—Chris Grant
*Assistant Examiner*—Matthew Demicco
(74) *Attorney, Agent, or Firm*—Georgann S. Grunebach; John A. Crook, III (57) ABSTRACT

A system and method for storing and retrieving program material for subsequent replay is disclosed. The method comprises the steps of receiving access control information and the program material encrypted according to a first encryption key, the access control information including the first encryption key and control data; further encrypting the access control information and the encrypted program material according to a second encryption key; encrypting the second encryption key according to a third encryption key to produce a fourth encryption key; and storing the encrypted access control information and encrypted program material and the fourth encryption key.

37 Claims, 7 Drawing Sheets

U.S. PATENT DOCUMENTS

| | | | | |
|---|---|---|---|---|
| 5,715,403 | A | * | 2/1998 | Stefik ............................ 705/44 |
| 5,721,829 | A | | 2/1998 | Dunn et al. |
| 5,724,646 | A | | 3/1998 | Ganek et al. |
| 5,729,280 | A | | 3/1998 | Inoue et al. |
| 5,761,302 | A | * | 6/1998 | Park ............................ 380/201 |
| 5,764,762 | A | | 6/1998 | Kazmierczak et al. |
| 5,793,971 | A | | 8/1998 | Fujita et al. |
| 5,805,699 | A | | 9/1998 | Akiyama et al. |
| 5,831,664 | A | | 11/1998 | Wharton et al. |
| 5,845,240 | A | | 12/1998 | Fielder |
| 5,899,582 | A | | 5/1999 | DuLac |
| 5,912,969 | A | | 6/1999 | Sasamoto et al. |
| 5,914,941 | A | | 6/1999 | Janky |
| 5,933,500 | A | | 8/1999 | Blatter et al. |
| 5,953,418 | A | | 9/1999 | Bock et al. |
| 5,966,186 | A | | 10/1999 | Shigihara et al. |
| 5,973,756 | A | | 10/1999 | Erlin |
| 6,011,511 | A | | 1/2000 | Chuong et al. |
| 6,025,868 | A | | 2/2000 | Russo |
| 6,055,314 | A | * | 4/2000 | Spies et al. ................. 380/228 |
| 6,061,452 | A | | 5/2000 | Suzuki |
| 6,069,647 | A | | 5/2000 | Sullivan et al. |
| 6,075,330 | A | | 6/2000 | Terk |
| 6,091,883 | A | | 7/2000 | Artigalas et al. |
| 6,097,441 | A | | 8/2000 | Allport |
| 6,144,400 | A | | 11/2000 | Ebisawa |
| 6,157,719 | A | | 12/2000 | Wasilewski et al. |
| 6,157,949 | A | | 12/2000 | Cheng et al. |
| 6,169,879 | B1 | | 1/2001 | Perlman |
| 6,229,895 | B1 | | 5/2001 | Son et al. |
| 6,263,504 | B1 | | 7/2001 | Ebisawa |
| 6,266,481 | B1 | * | 7/2001 | Lee et al. ..................... 386/94 |
| 6,370,688 | B1 | | 4/2002 | Hejna, Jr. |
| 6,437,836 | B1 | | 8/2002 | Huang et al. |
| 6,456,985 | B1 | * | 9/2002 | Ohtsuka ....................... 705/51 |
| 6,466,921 | B1 | * | 10/2002 | Cordery et al. ............... 705/60 |
| 6,473,858 | B1 | | 10/2002 | Shimomura et al. |
| 6,480,667 | B1 | | 11/2002 | O'Connor |
| 6,487,663 | B1 | | 11/2002 | Jaisimha et al. |
| 6,487,722 | B1 | | 11/2002 | Okura et al. |
| 6,502,139 | B1 | | 12/2002 | Birk et al. |
| 6,516,465 | B1 | * | 2/2003 | Paskins ....................... 725/25 |
| 2001/0001876 | A1 | | 5/2001 | Morgan et al. |
| 2002/0001386 | A1 | | 1/2002 | Akiyama |
| 2002/0170054 | A1 | | 11/2002 | Kudelski et al. |

OTHER PUBLICATIONS

B, Schneier, *Applied Cryptography—Protocols, Algorithms, and Source Code in C*, $2^{nd}$ Edition, pp. 216–222, 357–362.

*PocketTV Brings Video To Palm–size PC*, Mar. 9, 2000, 2 pages.

Yongchen Li, et al., *Security Enhanced MPEG Player*, IEEE, 1996, pp. 169–175.

Fink, *Ready to take the Dive? It's fast–forward as new DVD and Divx formats hit market* (includes graphic: Home video: the next generation plus: Some selections that show off the system), York Daily Record, Dec. 21, 1998, pp. 1–3.

Sin–Joo Lee, et al., *A Survey of Watermarking Techniques Applied To Multimedia*, IEEE, 2001, pp. 272–277.

P. Venkat Rangan et al., *Designing An On–Demand Multimedia Service*, IEEE Communications Magazine, Jul. 1992, vol. 30, No. 7, title page and pp. 56–64.

Wanjiun Liao et al., *The Split And Merge Protocol For Interactive Video–on–Demand*, IEEE Multimedia, Oct.–Dec. 1997, vol. 4, No. 4, index and pp. 51–62.

Robert Johnston et al., *Digital Television Sequence Store*, IEEE Transactions On Communications, May 1978, vol. COM–26, No. 5, index and pp. 594–600.

*Proposed SMPTE Standard For Television—Splice Points For MPEG–2 Transport Streams*, SMPTE Journal, Oct. 1998, SMPTE 312M, pp. 916–925.

Michael Robin et al., *Digital Television Fundamentals—Design and Installation Of Video And Audio Systems*, McGraw–Hill, Chapter 8, title page(s) and pp. 345–425.

* cited by examiner

VIDEO ON DEMAND PAY PER VIEW SERVICES WITH UNMODIFIED CONDITIONAL ACCESS FUNCTIONALITY

CROSS-REFERENCE TO RELATED APPLICATIONS

This application is related to the following patent applications, all of which applications are hereby incorporated by reference herein:

U.S. patent application Ser. No. 09/620,833, entitled "SECURE STORAGE AND REPLAY OF MEDIA PROGRAMS USING A HARD-PAIRED RECEIVER AND STORAGE DEVICE," by Raynold M. Kahn, Gregory J. Gagnon, David D. Ha, Peter M. Klauss, Christopher P. Curren, and Thomas H. James, filed on same date herewith;

U.S. patent application Ser. No. 09/621,476, entitled "SUPER ENCRYPTED STORAGE AND RETRIEVAL OF MEDIA PROGRAMS IN A HARD-PAIRED RECEIVER AND STORAGE DEVICE," by Raynold M. Kahn, Gregory J. Gagnon, David D. Ha, Peter M. Klauss, Christopher P. Curren, and Thomas H. filed on same date herewith;

U.S. patent application Ser. No. 09/620,773, entitled "SUPER ENCRYPTED STORAGE AND RETRIEVAL OF MEDIA PROGRAMS WITH MODIFIED CONDITIONAL ACCESS FUNCTIONALITY, "by Raynold M. Kahn, Gregory J. Gagnon, David D. Ha, Peter M. Klauss, Christopher P. Curren, and Thomas H. James, filed on same date herewith;

U.S. patent application Ser. No. 09/620,772, entitled "SUPER ENCRYPTED STORAGE AND RETRIEVAL OF MEDIA PROGRAMS WITH SMARTCARD GENERATED KEYS," by Raynold M. Kahn, Gregory J. Gagnon, David D. Ha, Peter M. Klauss, Christopher P. Curren, and Thomas H. James, filed on same date herewith; and U.S. patent application Ser. No. 09/491,959, entitled "VIRTUAL VIDEO ON DEMAND USING MULTIPLE ENCRYPTED VIDEO SEGMENTS," by Robert G. Arsenault and Leon J. Stanger, filed on Jan. 26, 2000.

BACKGROUND OF THE INVENTION

1. Field of the Invention

The present invention relates to systems and methods for providing video program material to subscribers, and in particular to a method and system for securely storing and replaying media programs.

2. Description of the Related Art

In recent years, there has been increasing interest in allowing cable and satellite television subscribers to record broadcast media programs for later viewing. This capability, hereinafter referred to as personal video recording (PVR), can be used to provide video-on-demand (VOD) services, or simply to allow the subscriber to save media programs for repeated viewing and/or archival purposes.

In the past, video cassette tape recorders (VCRs) have been used for such personal video recording. Recently, however, hard disks, similar to those used in personal computers, have been used to store media programs for later viewing. Unlike VCRs, such devices typically do not include a tuner, and are instead coupled to the satellite receiver or cable box. Also unlike VCRs, these devices are typically used to record digitized content, not analog video. This difference is both advantageous and disadvantageous.

An advantage of such devices is that they permit long term storage and multiple replays without substantial degradation. Another advantage is that they permit more rapid trick-play functions such as fast forwarding and rewinding. A disadvantage of such devices is that they are capable of making multiple-generation copies of the program material as well, and without serious degradation. This raises the very real possibility that the multiple generation copies of the media programs will be produced and distributed without permission. This possibility has caused some media providers to be reluctant to allow their media programs to be recorded by such devices.

To ameliorate this problem, it is critical to protect the stored media programs with strong security and copy control. Current devices do not scramble media programs before storage, nor do they store copy protection information. Instead, such devices record decrypted program content into the storage disk using a paired hardware scheme in which the hard disk controller and hard disk are paired to each other specifically through a specific interface. Because the hard disk controller and the disk itself are essentially paired together, storage or playback will not function if the disk were to be removed and transferred to another player. The weakness of this security scheme is that it relies only on the paired hardware to ensure security . . . the media programs stored on the disk drive itself are not encrypted.

While it would presumably be possible to simply store the datastream as it is received from the broadcaster for later replay, this technique has distinct disadvantages. One such disadvantage is that it would provide pirates a permanently recorded version of the encrypted datastream, thus providing the pirate with information that can be used to perform detailed analyses of the datastream itself to determine the encryption techniques and codes.

What is needed is a system and method for securely recording broadcast media programs (including impulse purchase pay-per-view programs) for limited use playback at a later time. Such a system could be used to support video-on-demand (VOD), thus allowing the subscriber to purchase media programs and games from the set top box instantly without worrying about the start time of the program. What is also needed is a system and method that does not require substantial changes to subscriber hardware, such as the conditional access module (CAM) that is used to provide the key to decrypt the media programs for presentation to the subscribers.

SUMMARY OF THE INVENTION

In summary, the present invention describes a system and method for storing and retrieving program material for subsequent replay. The method comprises the steps of receiving access control information and the program material encrypted according to a first encryption key, the access control information including the first encryption key and control data; further encrypting the access control information and the encrypted program material according to a second encryption key; encrypting the second encryption key according to a third encryption key to produce a fourth encryption key; and storing the encrypted access control information and encrypted program material and the fourth encryption key.

The apparatus comprises a tuner, for receiving encrypted access control information and the program material encrypted according to a first encryption key, the access control information including the first encryption key and control data; a first encryption module, communicatively coupled to the tuner and communicatively coupleable to a data storage device, the first encryption module for further encrypting the encrypted program material and the access control information according to a second encryption key; a second encryption module, communicatively coupled to the first encryption module and communicatively coupleable to the data storage device, the second encryption module for encrypting the second encryption key according to a third encryption key to produce a fourth encryption key; a first decryption module, communicatively coupleable to the disk drive, for decrypting the fourth encryption key to produce the second encryption key; a second decryption module, communicatively coupled to the first decryption module and the tuner and communicatively coupleable to the data storage device, for decrypting the further encrypted program material to produce the encrypted program material and the encrypted access control information using the second encryption key; a conditional access module, communicatively coupleable to the second decryption module and the tuner, for selectably accepting the access control information selected from the group comprising the access control information received in the tuner and the access control information decrypted by the second decryption module, the conditional access module comprising a third decryption module for decrypting the encrypted access control information to produce the first encryption key; and a fourth decryption module for decrypting the encrypted program material to produce unencrypted program material using the first encryption key.

One object of the present invention is to provide for the reception and decryption of broadcast media programs, including impulse pay-per-view (IPPV) programs, that can be played and recorded onto storage media and allows playback at a later time with limited use. The data itself may be placed in short term storage, but the replay of the media programs can be accomplished with trick play functions such as forward, reverse, fast forward, fast reverse, frame advance, and pause functions.

Another object of the present invention is to provide PVR functions which provide recording, delayed playback, and trick play of IPPV media programs from the storage media without requiring a pre-purchase of the IPPV media program. This would allow the IPPV media program to be purchased and viewed at the users leisure without requiring the IPPV media program to be purchased prior to storage. Ideally, such a system would allow the user to select the IPPV media program from the storage device, subject to limited play rights.

Still another object of the present invention is to provide a pairing between the storage media and elements of the subscriber's IRD to assure that playback of the media programs from the storage device are permitted only with the proper IRD.

Still another object of the present invention is to provide a secure means for storing broadcast data streams (including IPPV and games) on a data storage device, while providing for adequate copy protection.

Still another object of the present invention is to provide a system and method for handling the archiving and retrieving of media programs and other data, even if the data storage device fails.

Still another object of the present invention is to provide a system and method that allows media program purchases to be recorded in a way that is analogous to that which is employed for real-time off-the-air programs.

Still another object of the present invention is to provide a system that provides a growth path to a system permitting IPPV media programs to be previewed without charge for an initial period of time with the option to purchase the media program or cancel the purchase, regardless of whether the program is retrieved from the storage device or obtained from a real time broadcast.

Still another object of the present invention is to achieve all of the foregoing without requiring substantial changes to conditional access module hardware and/or software.

The present invention eliminates concerns regarding the proliferation of unauthorized digital copies of the media programs by use of a strong encryption method. Further, the present invention ensures that the stored material cannot be distributed since such decryption of the material can only be successfully performed by the encrypting IRD.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which show, by way of illustration, several embodiments of the present invention. It is understood that other embodiments may be utilized and structural changes may be made without departing from the scope of the present invention.

Video Distribution System

Figure 1:
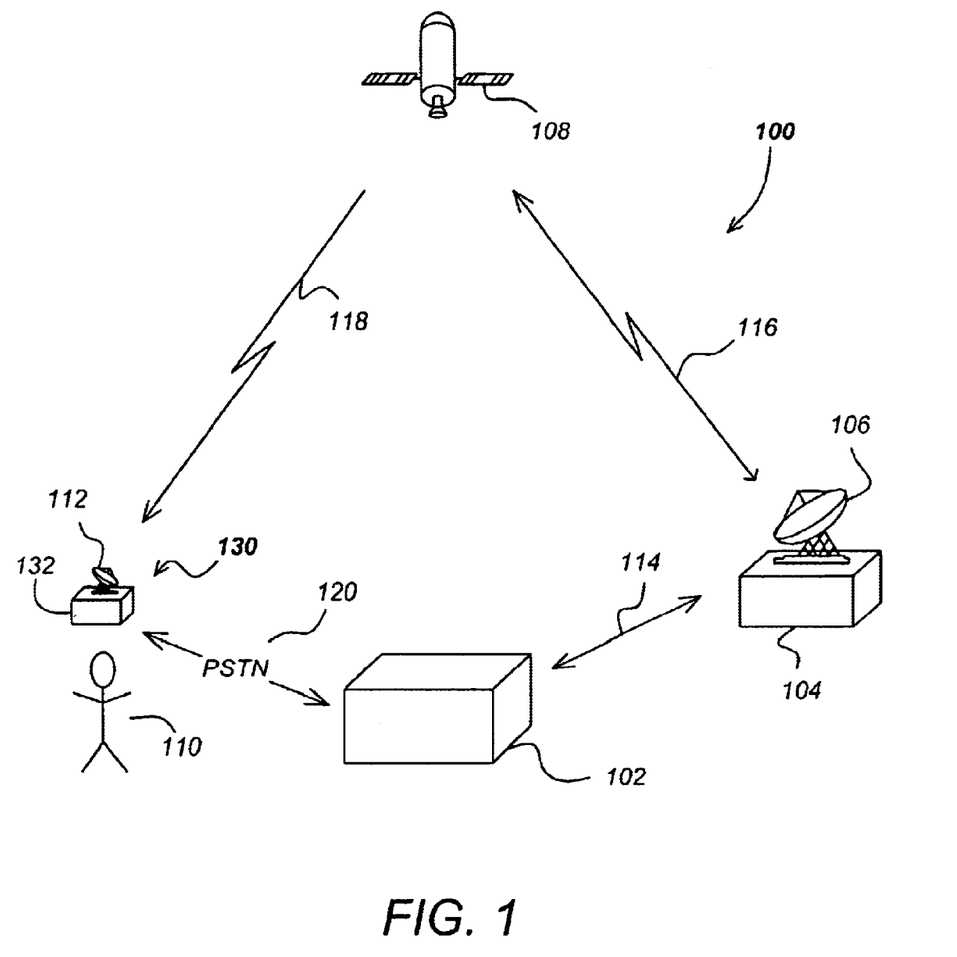
FIG. 1 is a diagram showing an overview of a video distribution system.

FIG. 1 is a diagram illustrating an overview of a video distribution system 100. The video distribution system 100 comprises a control center 102 in communication with an uplink center 104 via a ground or other link 114 and an integrated receiver/decoder (IRD) 132 at receiver station 130 via a public switched telephone network (PSTN) or other link 120. The control center 102 provides program material to the uplink center 104, coordinates with the receiver station 130 to offer subscribers 110 pay-per-view (PPV) program services, including billing and associated decryption of video programs.

The uplink center 104 receives program material and program control information from the control center 102, and using an uplink antenna 106, transmits the program material and program control information to the satellite 108 via uplink 116. The satellite 108 receives and processes this information, and transmits the video programs and control information to the IRD 132 at the receiver station 130 via downlink 118. The IRD 132 receives this information using the subscriber antenna 112, to which it is communicatively coupled.

The video distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscribers 110. However, using data compression and multiplexing techniques the channel capabilities are far greater. For example, two-satellites 108 working together can receive and broadcast over 150 conventional (non-HDTV) audio and video channels via 32 transponders.

While the invention disclosed herein will be described with reference to a satellite based video distribution system 100, the present invention may also be practiced with terrestrial-based transmission of program information, whether by traditional broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber is video (and audio) program material such as a movie, the foregoing method can be used to deliver program material comprising purely audio information or data as well.

Figure 2:
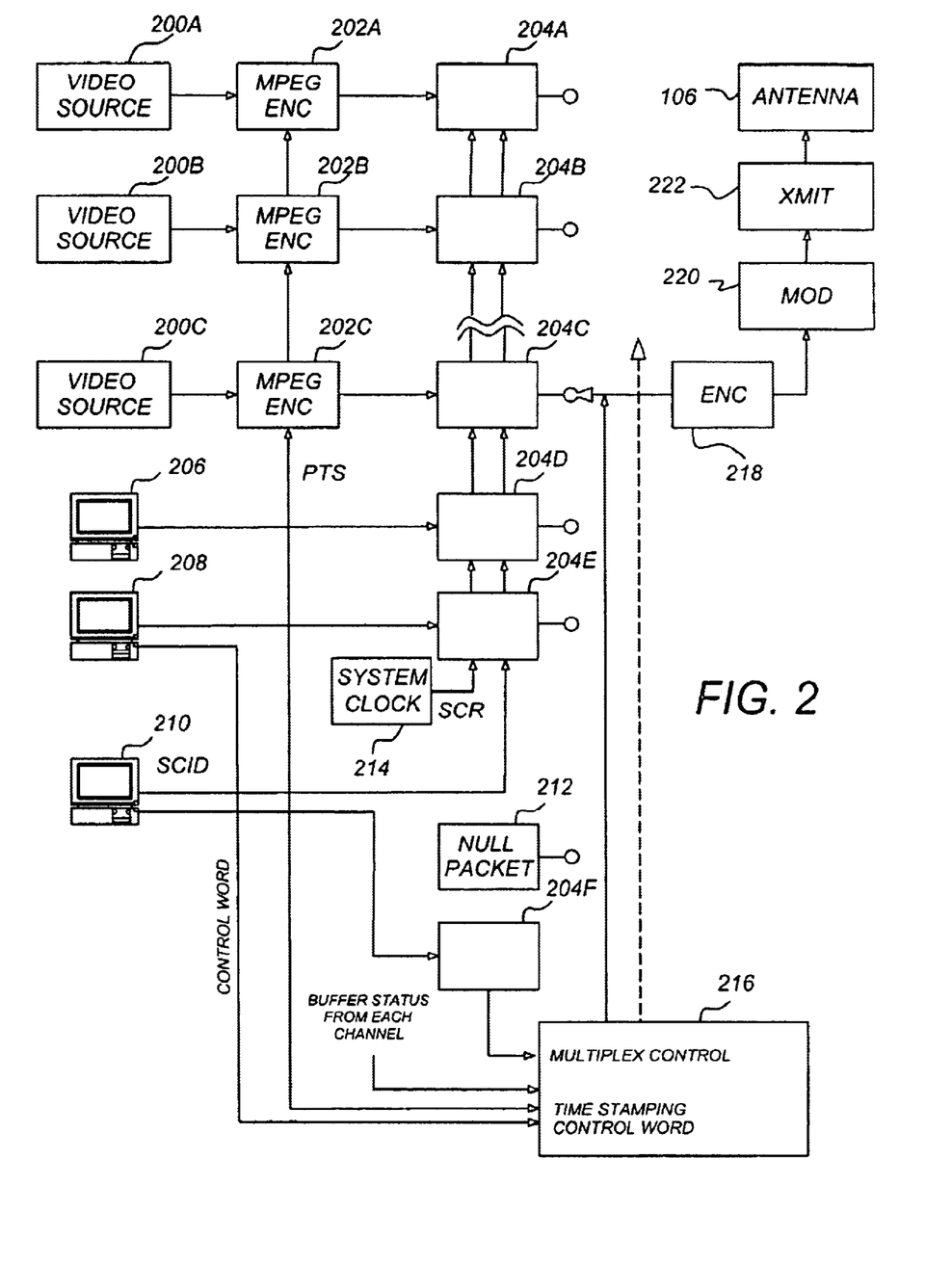
FIG. 2 is a block diagram showing a typical uplink configuration showing how video program material is uplinked to a satellite for transmission to subscribers using a single transponder.

FIG. 2 is a block diagram showing a typical uplink configuration for a single satellite 108 transponder, showing how video program material is uplinked to the satellite 108 by the control center 102 and the uplink center 104. FIG. 2 shows three video channels (which could be augmented respectively with one or more audio channels for high fidelity music, soundtrack information, or a secondary audio program for transmitting foreign languages), and a data channel from a computer data source 206.

The video channels are provided by a program source of video material 200A–200C (collectively referred to hereinafter as video source(s) 200). The data from each video program source 200 is provided to an encoder 202A–202C (collectively referred to hereinafter as encoder(s) 202). Each of the encoders accepts a presentation time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a second generation Motion Picture Experts Group (MPEG-2) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204A–204F (collectively referred to hereinafter as packetizer(s) 204) associated with each source 200, 206–210.

The data packets are assembled using a reference from the system clock 214 (SCR), a control word (CW) generated by the conditional access manager 208, and a system channel identifier (SCID) generator 210 that associates each of the data packets that are broadcast to the subscriber with a program channel. This information is transmitted to the packetizers 204 for use in generating the data packets. These data packets are then multiplexed into serial data, encoded, modulated, and transmitted. A special packet known as a control word packet (CWP) which comprises control data including the control word (CW) and other control data used in support of providing conditional access to the program material is also encrypted and transmitted.

Figures 3A, 3B:
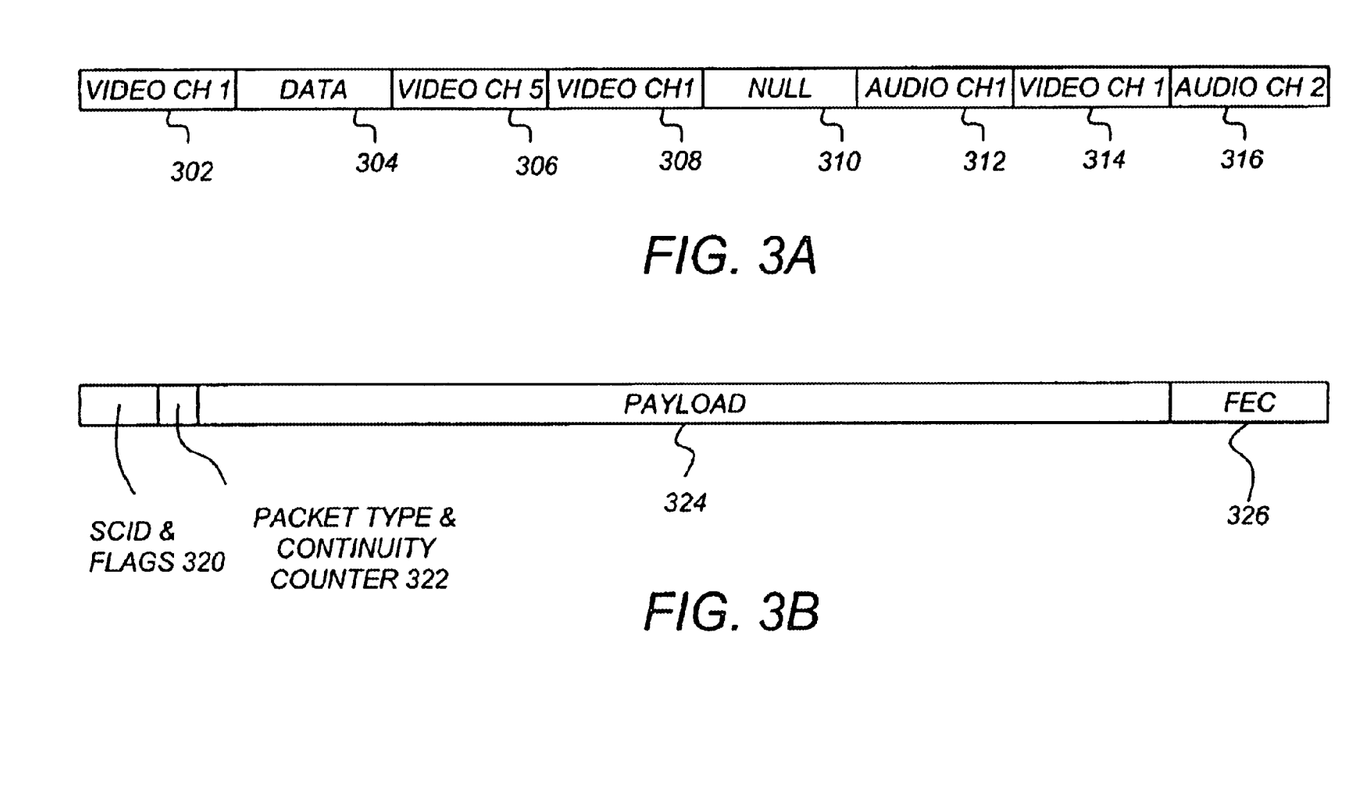
FIG. 3A is a diagram of a representative data stream received from a satellite.
FIG. 3B is a diagram illustrating the structure of a data packet.

FIG. 3A is a diagram of a representative data stream. The first packet segment 302 comprises information from video channel 1 (data coming from, for example, the first video program source 200A). The next packet segment 304 comprises computer data information that was obtained, for example from the computer data source 206. The next packet segment 306 comprises information from video channel 5 (from one of the video program sources 200), and the next packet segment includes information from video channel 1 (again, coming from the first video program source 200A). The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106.

Subscribers 110 receive media programs via a subscriber receiver or IRD 132. Using the SCID, the IRD 132 reassembles the packets to regenerate the program material for each of the channels. As shown in FIG. 3A, null packets created by the null packet module 212 may be inserted into the data stream as desired.

FIG. 3B is a diagram of a data packet. Each data packet (e.g. 302–316) is 147 bytes long, and comprises a number of packet segments. The first packet segment 320 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 322 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 324 comprises 127 bytes of payload data, which is a portion of the video program provided by the video program source 200. The final packet segment 326 is data required to perform forward error correction.

Encryption of Media Programs

Media programs are encrypted by the encryption module 218 before transmission to assure that they are received and viewed only by authorized subscribers. Each media program is encrypted according to an alphanumeric encryption key referred to hereinafter as a control word (CW). This can be accomplished by a variety of data encryption techniques, including symmetric algorithms such as the data encryption standard (DES) and asymmetric algorithms such as the Rivest-Shamir-Adleman (RSA) algorithm.

To decrypt the media programs, the subscriber's 110 IRD 132 must also have access to the CW. To maintain security, CWs are not transmitted to the IRD 132 plaintext. Instead, CWs are encrypted before transmission to the subscriber's IRD 132. The encrypted CW is transmitted to the subscriber's IRD 132 in a control word (data) packet.

In one embodiment, the data in the CWP, including the CW, is encrypted and decrypted via what is referred to hereinafter as an input/output (I/O) indecipherable algorithm.

An I/O indecipherable algorithm is an algorithm that is applied to an input data stream to produce an output data stream. Although the input data stream uniquely determines the output data stream, the algorithm selected is such that it's characteristics cannot be deciphered from a comparison of even a large number of input and output data streams. The security of this algorithm can be further increased by adding additional functional elements which are non-stationary (that is, they change as a function of time). When such an algorithm is provided with identical input streams, the output stream provided at a given point in time may be different than the output stream provided at another time.

So long as the encryption module 218 and the IRD 132 share the same I/O indecipherable algorithm, the IRD 132 can decode the information in the CWP to retrieve the CW. Then, using the CW, the IRD 132 can decrypt the media program so that it can be presented to the subscriber 110.

To further discourage piracy, the control data needed to decrypt and assemble data packets into viewable media programs may be time-varying (the validity of the control data in a CWP to decode a particular media program changes with time). This can be implemented in a variety of ways.

For example, since each CWP is associated with a SCID for each media program, the SCID related to each CWP could change over time.

Another way to implement time-varying control data is to associate time stamps with the received data stream and the CWP control data. In this case, successful decoding of the CWP to produce the CW would require the proper relationship between the time stamps for the data stream and the control data in the CWP. This relationship can be defined, for example, by changing the decryption scheme used to generate the CW from the CWP according to the received time stamp for the data stream. In this case, if the time stamp of the received data stream does not match the expected value, the wrong decryption scheme will be selected and the proper CW (to decrypt the program material) will not be produced. If, however, the time stamp of the received data stream matches the expected value, the proper decryption scheme will be selected, and the CWP decryption scheme will yield the proper CW.

Requesting Pay-Per-View Services

The data required to receive pay-per-view (PPV) media programs are stored in the CWP and in another data packet known as the purchase information parcel (PIP). Both the CWP and the PIP are broadcast to the subscriber via the video distribution system 100 in real time. As described below, the CWP is used by the IRD 132 to retrieve PPV media programs.

Generally, PPV services can include operator-assisted pay-per-view (OPPV) and impulse pay-per-view (IPPV) services. When requesting OPPV services, the subscriber 110 must decide in advance that they desire access to a particular media program. The subscriber 110 then calls an entity such as the control center 102, and requests access to the media program. When requesting impulse pay-per-view services (IPPV), the subscriber 110, while viewing the program guide, moves the cursor over the viewer channel associated with the desired media program, and selects "enter." After the decision and rights to purchase a PPV program are confirmed (for example, by checking channel lockouts, rating limits, and purchase limits), a purchase information parcel (PIP) is received and stored in the subscriber's conditional access module 406 (which is described in more detail below) for further use. The conditional access module 406 associates the information in the CWP and the PIP, and uses the PIP in conjunction with the CWP to verify that the subscriber 110 should be provided access to the media program and to decrypt the media program.

Ordering PPV media programs in advance using the PIP is limited, however, since the PIP is broadcast up to 24 hours before the media program itself is broadcast. Since the PIP is broadcast in real time, the IRD 132 does not acquire the PIP until the subscriber 110 actually requests the PPV media program purchase.

Subscriber Reception and Decryption of Media Programs

Figure 4:
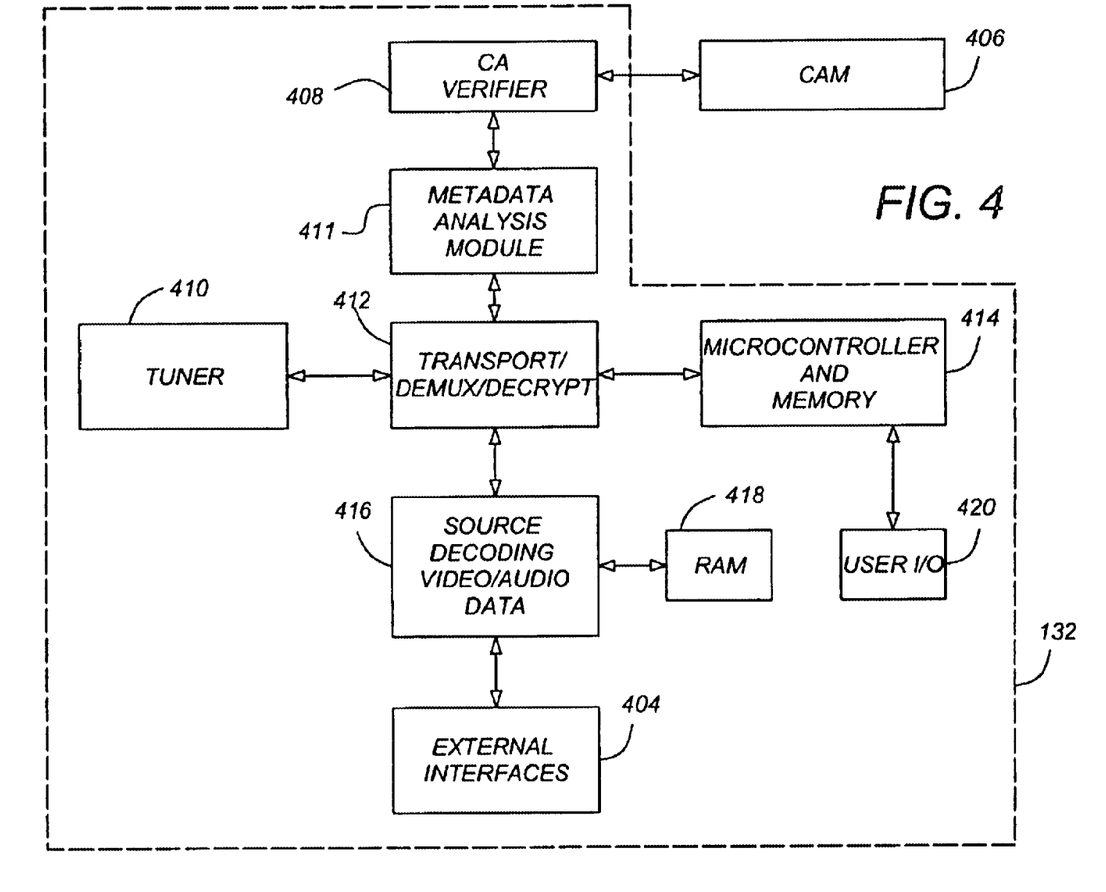
FIG. 4 is a block diagram illustrating a high-level block diagram of the IRD.

FIG. 4 is a simplified block diagram of an IRD 132. The IRD 132 receives and decrypts the media programs broadcast by the video distribution system 100. These media programs are streamed to the IRD 132 in real time, and may include, for example, video, audio, or data services.

The IRD 132 is communicatively coupleable to a conditional access module (CAM) 406. The CAM 406 is typically implemented in a smart card or similar device, which is provided to the subscriber 110 to be inserted into the IRD 132. The CAM 406 interfaces with a conditional access verifier (CAV) 408 which performs at least some of the functions necessary to verify that the subscriber 110 is entitled to access the media programs. The CAV 408 is communicatively coupled to a metadata analysis module (MAM) 411. Using the information in metadata table (e.g. Table 1 described below), the MAM 411 acts as a gatekeeper to determine whether stored media programs will be decrypted and presented to the subscriber 110. This is accomplished by comparing the metadata values with measured or accumulated values. The CAV 408 and the MAM 411 can be implemented as separate modules from the transport/demux/decryptor 412 and the microcontroller and memory 414 as shown, or may be implemented via software instructions stored in the memory and performed by the microcontroller 414. The functionality of the MAM 411 can also be implemented in the verifier 410 or in software resident elsewhere in the IRD 132.

The IRD 132 comprises a tuner 410, a transport and demultiplexing module (TDM) 412, which operates under control of a microcontroller and associated memory 414, a source decoder 416 and communicatively coupled random access memory (RAM) 418, and a user I/O device for accepting subscriber 110 commands and for providing output information to the subscriber.

The tuner receives the data packets from the video distribution system and provides the packets to the TDM 412. Using the SCIDs associated with each media program, the TDM 412 reassembles the data packets according to the channel selected by the subscriber 110, and unencrypts the media programs using the CW key. The TDM 412 can be implemented by a single secure chip, and is communicatively coupled to a microcontroller and memory 414.

Once the media programs are unencrypted, they are provided to the source decoder 416 which decodes the media program data according to MPEG or JPEG standards as appropriate. The decoded media program is then provided to a D/A converter (if necessary) and provided to external interfaces 404 which can include a media program presentation device such as a television, an audio system, or a computer. The source decoder 416 makes use of communicatively coupled RAM 418 to perform these functions.

The CW key is obtained from the CWP using the CAV 408 and the CAM 406. The TDM 412 provides the CWP to the CAM 406 via the CAV 408. The CAM 406 uses the I/O indecipherable algorithm to generate the CW, which is provided back to the TDM 412. The TDM 412 uses the CW to decrypt the media programs. In most IRDs 132, the CAV 408 and the CAM 406 are capable of decrypting one video/audio/data media program at a time.

As described above, to discourage potential pirates, the control data in the CWP used to decode a particular media program may change with time so that it only produces the proper CW when applied to a media program having the proper time stamp. In this case, the CAM 406 can select and/or control the decryption scheme (e.g. the I/O indecipherable algorithm) according to the time stamp associated with the data stream carrying the media program. If the media program is sufficiently disassociated in time, the improper decryption scheme will be used, and the proper CW to decode the media program will not be produced.

Further details regarding the encryption and decryption of media programs can be found in co-pending and commonly assigned U.S. patent application Ser. No. 09/491,959.

Storage and Retrieval of Media Programs in Encrypted Form

Figure 5A:
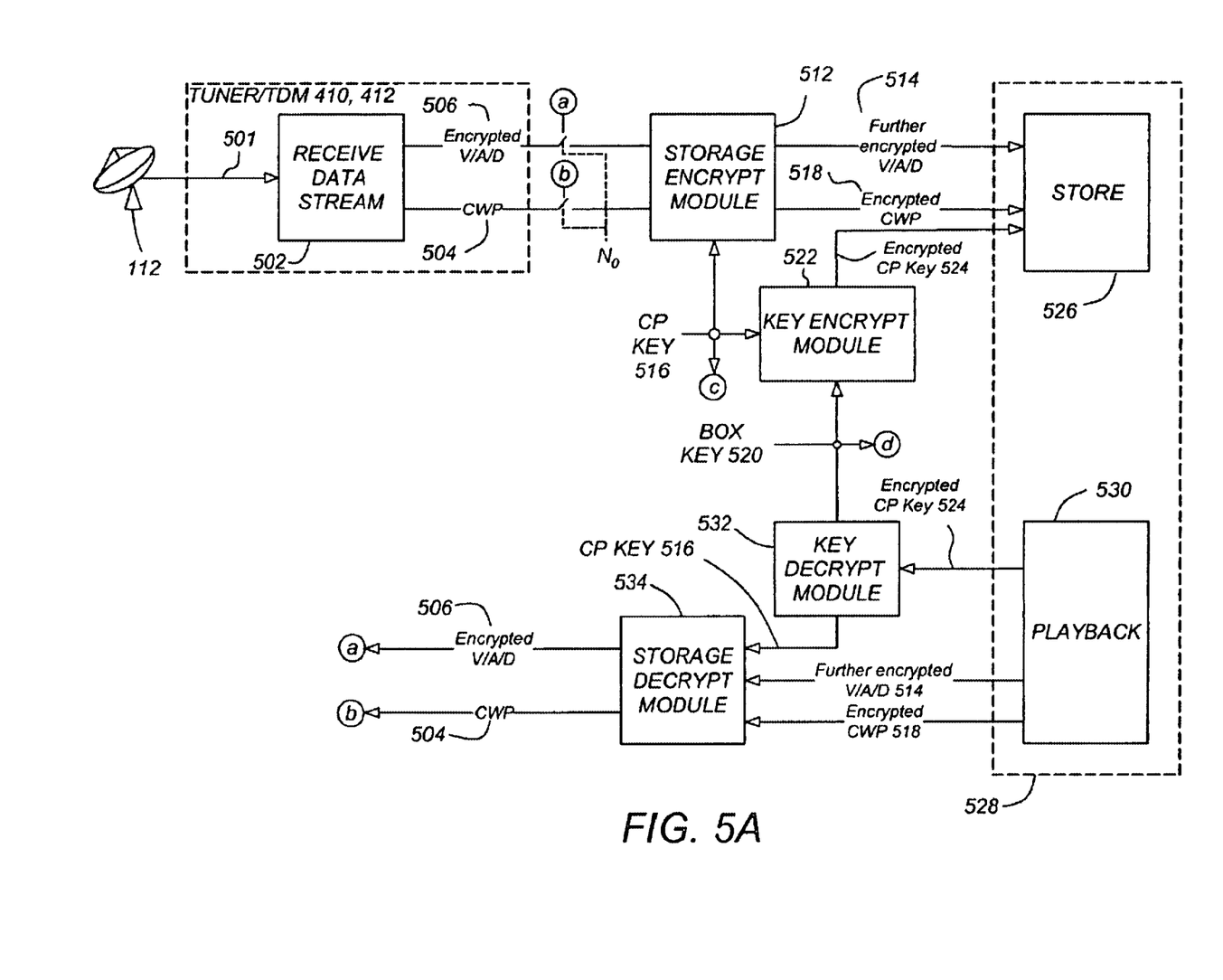
FIGS. 5A–5C are diagrams illustrating the storage and retrieval of data from a media storage device.
Figure 5B:
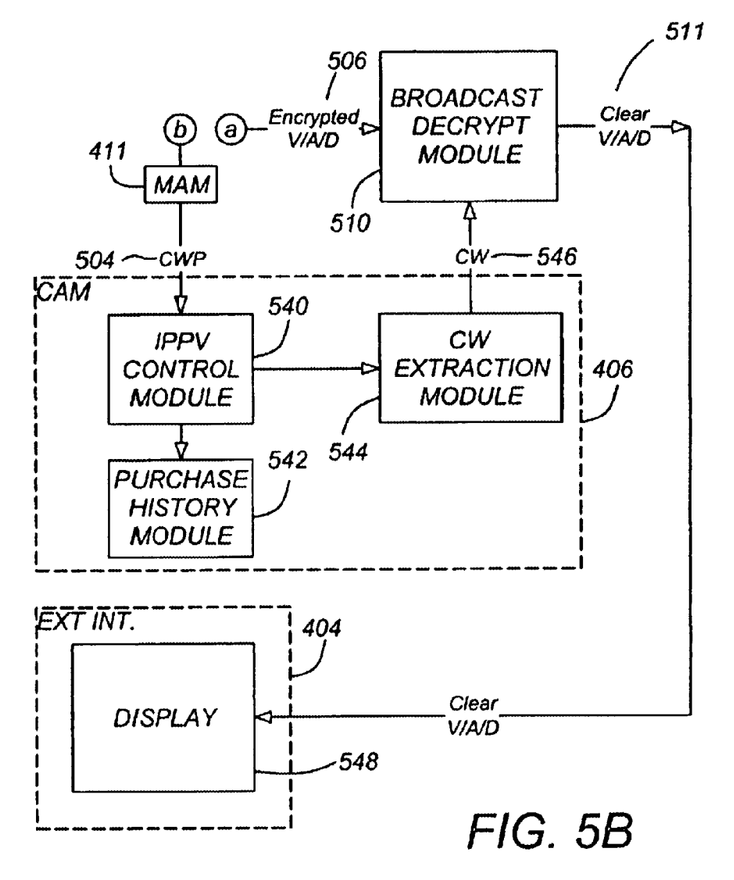

FIG. 5A is a diagram presenting exemplary method steps used to practice one embodiment of the present invention. A data stream 501 is provided by the subscriber antenna 112 and received by the tuner 410 and the TDM 412, as shown in block 502. The data stream 501 includes a plurality of data packets including data packets with the program material encrypted according to a first encryption key (CW key 546 as seen in FIG. 5B), and one or more control word packets (CWP) 504. The control word packets 504 contain access control information and other data which may be processed to produce the CW key 546 necessary to decrypt the program material.

The data stream 501 may also include metadata describing information including rights associated with the program material (which may include, for example, replay rights and/or copy rights). These rights include parameters necessary for controlling the replay of program material, including IPPV or pay-per-play services. The metadata can include information as described in Table I below:

TABLE I

| Right | Value | Comment |
|---|---|---|
| Storage | $N_0$ | $N_0$ index indicates whether the program material is permitted to be stored long-term on the media storage device 528 (value 1) or if it was intended for real time viewing only (value 0). |
| Lifetime without purchase | $N_1$ | $N_1$ index indicates how long an item is permitted to be stored onto the media storage device 528 without actually being purchased. This time period could be days, weeks or months depending on the business case. When/if this time limit is reached, the associated program material is erased from the media storage device 528. |
| Lifetime after purchase | $N_2$ | $N_2$ index indicates how long program material is permitted to be stored onto the hard disk after being purchased. This time period could be days, weeks or months depending on the business case. When/if this time limit is reached, the associated program is erased from the media storage device 528. |

TABLE I-continued

| Right | Value | Comment |
|---|---|---|
| Views per pay | $N_3$ | $N_3$ index indicates how many times a subscriber is permitted to use/view the program material per times it was paid for. For example, a value of 0 could indicate unlimited use, and any non-zero value could indicate how may uses are allowed per pay. |
| Repurchase a program | $N_4$ | $N_4$ indicates the cost associated with repurchasing a program after the $N_3$ value has been exceeded (assuming $N_3$ is not unlimited). Depending on the business case, $N_4$ may or may not be higher or lower than the original purchase offer price. |
| Views per repurchase | $N_5$ | $N_5$ would indicate how many times a user would be able to use/view the program material after it had been purchased once. For example, a value of 0 could indicate unlimited use, and any non-zero value could indicate how may uses are allowed per pay. Depending on the business case, the value for $N_5$ may or may not be the same as $N_3$. |
| Reserved | $N_6$ - $N_M$ | Reserved values to place additional limits on the usage of downloaded materials. The value of M could be as large or as small as needed depending on the complexity of the desired business case. |

If the program material is not to be stored in the media program storage device 528 (as indicated by the switch controlled by $N_0$), the encrypted program material 506 and the CWP 504 are processed normally, as shown in FIG. 5B. The CWP 504 is presented to the IPPV control module in the CAM 406 which analyzes the access control information in the CWP 504 to determine whether or not the subscriber is entitled to view the program material. If so, the CW extraction module 544 produces the control word from data in the CWP and supplies it to the broadcast decrypt module 510 to decrypt the program material 511 for display.

The information describing the subscriber's rights to view the program material (e.g. Table I) may have been previously received from the service provider or from an IPPV purchase action or a subscriber-initiated action preceding the viewing of the program. The subscriber action commands the IPPV control module 540 in the CAM 406 to store IPPV entitlement information in the purchase history module 542 in the CAM 406 for later reporting to the service provider.

In one embodiment, the metadata table is initially provided to the subscriber with defaults for each of the settings, and/or is supplied as a part of the IRD 132 software. When a program is broadcast that is to be stored onto the hard disk for storage and later PPV, the default metadata table is attached (e.g. by the IRD 132 verifier 408). For the majority of the broadcasted events and programs, the default settings are sufficient, and no further changes are required.

If a need arises to change one of the settings for a particular program, the change to the specific parameter, and not the entire metadata table, is broadcast to the subscriber. The IRD 132 then recognizes the parameter change, and modifies the metadata table according to the specific parameter change. This way, the broadcaster is required only to broadcast the non-default values, and not the same table for each program. This saves valuable broadcast bandwidth and IRD 132 operations required to build and store multiple metadata tables.

The metadata could also be used to pre-cache content onto a subscriber's 110 storage device 528. The content would be "hidden" from the subscriber 110 until a specified time and/or date, or another condition (which can be described in the metadata table) takes place. For example, the program title would not initially be presented in the available cache or other areas of the user interface. After the appropriate condition is satisfied (e.g. at the appropriate time), the content would then be presented to the subscriber 110 as an available program. This would allow the video broadcast system to send content at opportune times for broadcast, such as during the night when bandwidth demands are low. This can happen either the day of an event or even weeks ahead of time. These pre-cached events could be triggered to present content that relates to either special events or during times and dates specified by the content providers.

The metadata can also be provided as a part of the data stream 501 from a different satellite 108 transponder than the program material, from a different satellite 108, or from a land link such as the PSTN link 120.

After suitable processing (i.e. MPEG and or JPEG decoding, decompression, conversion to an analog signal, etc.), the program material 511 is provided to an external interface 404 device, which may include a presentation device such as a display 548.

If the program material is to be stored in the media program device 528, the encrypted program material 506 (denoted Encrypted V/A/D in FIGS. 5A–5C to indicate that the program material can include video, audio, or other data) is provided to a storage encryption module 512. The storage encryption module 512 further encrypts the encrypted program material 506 and the CWP 504 according to a CP encryption key 516. Further, a key encryption module 522 encrypts the CP key 516 with a box key 520 to produce an encrypted CP key 524. The resulting further encrypted program material 514, the encrypted CWP 518, and the encrypted CP key 524 are stored in the media storage device 528, as shown in block 526. When replay of the stored program material is desired, the further encrypted program material 514, the encrypted CWP 518 and the encrypted CP key 524 are retrieved from the media storage device 528 as depicted in block 530. Using the box key 520, the encrypted CP key 524 is decrypted by the key decryption module 532 to produce the CP key 516. The CP key 516, the further encrypted program material 514 and the encrypted CWP 518 is provided to the storage decrypt module 534. Using the CP key 516, the CP decrypt module 534 produces the encrypted program material 506 (still encrypted with the CW key as it was when it was received by the tuner 410) and the CWP 504 (which is again in the same form as it was when it was received by the tuner 410).

Should the storage device 528 fail, the data stored therein may still be recovered. Unlike prior art video storage devices, which prevent copying of the data from the storage media via a controller that writes data to the storage media, the present invention stores the data in encrypted form as well as at least part of the information required Since the present invention stores data in encrypted form as well as a key required to decrypt the data (using other keys in the IRD 132), the present invention allows the user to back up data stored in the media storage device 528 on another data storage device such as a zip drive or a writable CD ROM. Further, the such backup data is encrypted, and not exposed to copying.

FIG. 5B is a diagram showing additional operations performed when the subscriber 110 elects to view program material stored on the media storage device 528.

When the subscriber 110 elects to view recorded program material, the MAM 411 compares the metadata associated with the program material (which may include data regarding the rights shown in Table I above) with other stored information to determine whether the recorded program material should be decrypted and presented. If the comparisons performed by the MAM 411 indicate that the stored program material should be decrypted and presented to the subscriber 110, the CWP 504 is provided to the CAM 406. The CAM 406 includes an IPPV (impulse pay-per-view) control module 540 which commands CW extraction module 544 to decrypt the CWP 504 to produce the CW 546, and provides information regarding the subscriber's 110 decision to purchase the right to view the program material to a purchase history module 542. The purchase history module 542 records information regarding the subscriber's 110 purchase, and provides the information to the entity that provided the program material to the subscriber for billing purposes. The IPPV control module 540 essentially performs the same functions as that which would be required for non-storage compatible operations. Hence, the foregoing functionality is accomplished without resort to changes in CAM 406 functionality.

Importantly, the embodiment described above does not require changes to the CAM 406, since the operations described in FIG. 5B are exactly the same as normal operation when the program material is not stored on the media storage device. Further, this embodiment does not require alteration of the CWP 504 to account for any temporally varying relationship between the information in the CWP 504 and the program material. That is because any time-dependent relationship between the SCIDs of the program material and the CWP are preserved when they are encrypted and stored on the media storage device.

Figure 5C:
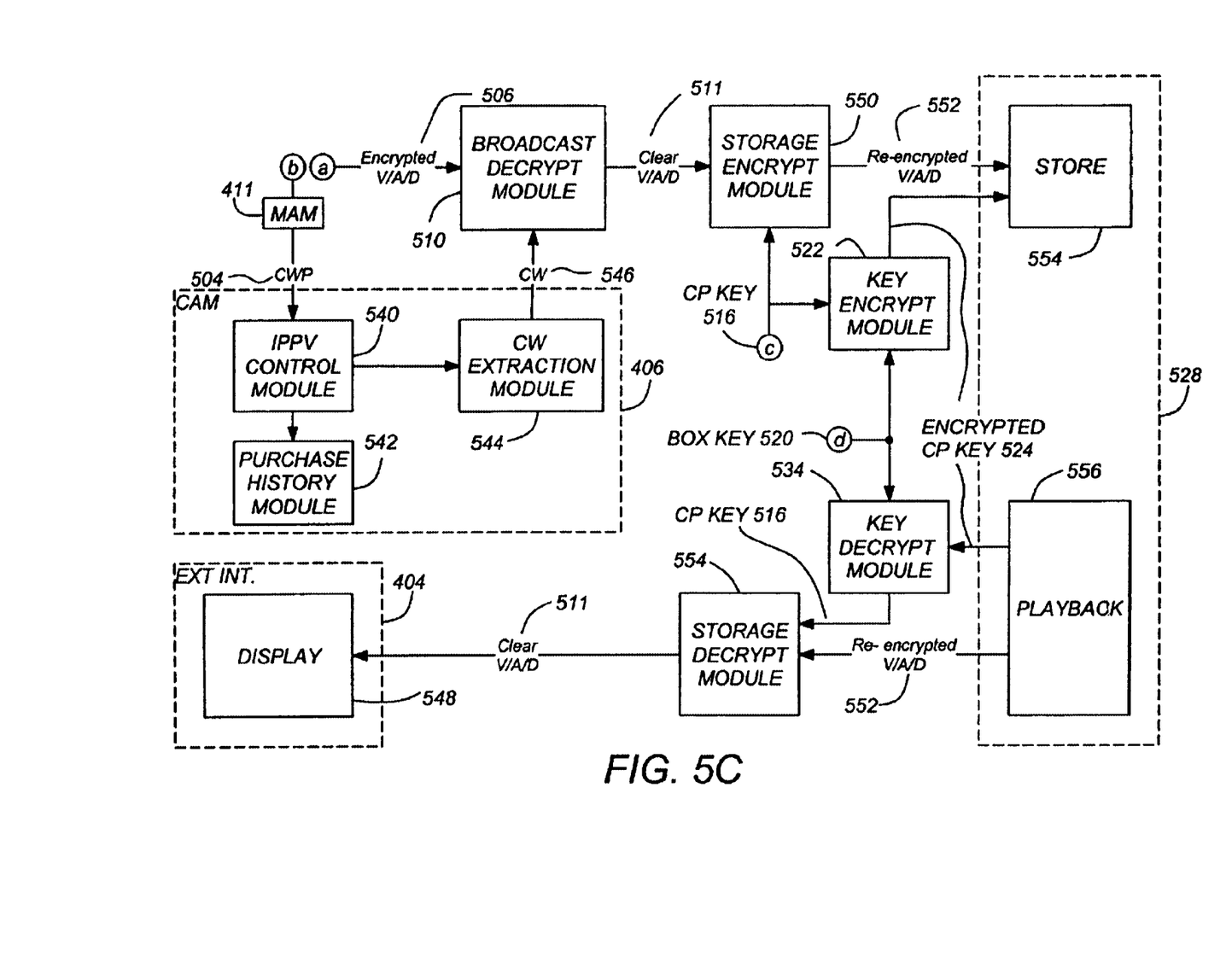

FIG. 5C is a diagram showing an embodiment of the present invention in which the unencrypted program material is re-encrypted and stored on the data storage device 528 (or a second data storage device separate from the data storage device 528) and retrieved for presentation to the subscriber 110. This embodiment is useful, for example, to support the enforcement of the replay and copy protection rights described in Table I. This embodiment is also useful when the subscriber 110 requests trick play operations in viewing program material stored on the media storage device 528. These trick play operations include, for example, a play command; a rewind command; a fast forward command; a fast reverse play command; a fast forward play command; a pause command; a frame step command; and a stop command.

In this embodiment, the unencrypted program material 511 is not provided directly for display, but rather copy protection encrypted, stored in the data storage device 528 (or a second data storage device), and retrieved and decrypted before providing the program material for display. In particular, the unencrypted program material 511 is provided to a second Storage Encrypt Module 550. The second Storage Encrypt Module 550 encrypts the unencrypted program material 511 using the CP encryption key 516 to produce re-encrypted program material 552. The CP encryption key 516 is also encrypted by the key encrypt module 522 to produce the encrypted CP key 524. Both the re-encrypted program material 552 and the encrypted CP key 524 are stored in the media storage device 528.

When a user command is provided to the user I/O 420 that requires playback of the program material, the re-encrypted program material 552 and encrypted CP key 524 are retrieved from the media storage device 528. The encrypted CP key is decrypted by the key decrypt module 532 to produce the CP encryption key 516. The re-encrypted program material 552 and the CP encryption key 516 is provided to a storage decrypt module 554. The storage decrypt module 554 decrypts the re-encrypted program material 552 to produce a clear version of the program material 511. The program material 511 is provided to an external interface 404 such as the display 548 for presentation to the user.

In the preferred embodiment, the storage encrypt module 550 and decrypt modules 554 described above with respect to FIG. 5C are different modules than that which are described and illustrated in FIG. 5A. This allows parallel encryption operations to be performed, thus speeding up the process, and allowing for the application of different CP encryption keys. However, the present invention may also be implemented such that the same CP encrypt and decrypt modules are used for both operations. This includes an implementation where different CP keys are used, and switched into the modules as required.

Similarly, it should be noted that FIGS. 5A and 5C illustrate an embodiment wherein the storage encrypt and storage decrypt modules 550, 554 are separate modules. However, the present invention may also be implemented with a single Storage Encryption and Decryption module, which may be switched between encrypt and decrypt functionality.

Similarly, the key encrypt and decrypt functionality described in FIGS. 5A and 5C are illustrated as separate modules, whereas the same optional usage of one or more modules may be utilized to perform the functionality.

The present invention also envisions the use of the same or similar encryption mechanisms are used for the broadcast decryption, storage encryption and decryption, and key encryption and decryption to allow one or more such modules to perform any of the encrypt or decrypt functions described in FIGS. 5A and 5C.

Generally, the box key 520 is unique to the IRD 132 and the CP key is unique to the media program, but this need not be the case. Further, different techniques and mechanisms can be used to generate and install the IRD-unique box key 520 and the media program unique CP key. In a preferred embodiment, the box key 520 is factory configured, and the CP key is generated randomly by the IRD 132, and is unique for each stored media program.

Finally, it is noted that in the embodiment described above, the media storage device 528 depicted in FIG. 5C is the same media storage device 528 depicted in FIG. 5A. If desired, however, the re-encrypted program material 552 can be stored in a second (and separate) media storage device. For that matter, any of data described in the foregoing can be stored in a plurality of media storage devices to increase throughput or facilitate additional security measures. This embodiment would permit faster storage and retrieval of information from the disk(s).

In the foregoing embodiment of the present invention, the data stream received in IRD 132 further includes metadata including data to control replay rights and copy protection. This metadata is stored in the media storage device 528 for later use when a request to view the media program is received. The stored metadata may or may not be encrypted and/or signed.

Conclusion

The present invention describes a system and method for recording program related material that has not yet been purchased, and allow IPPV purchase at the time of replay and viewing. Billing will only be applied if the purchase is made. The data stream 501 having the program material is subject to different limitations on such storage and replay depending on the associated metadata for each program. The program material can be presented to the subscriber 110 in real time, or can be further encrypted prior to storage for later-playback. In either case, program material is not stored plaintext. Caching techniques can be used to allow the user to delay or shift a program, or to support trick play functions.

When the program material and associated data is not intended to be stored on the hard disk for later playback, the IRD 132 sends the encrypted program material 506 and associated CWP 504 to the CAM 406. The CAM 406 decrypts the CWP 504 to obtain the CW key 546, and the CW key 546 is used to decrypt the program material so that it can be presented to the subscriber 110.

If a media storage device 528 is available to the IRD 132, the media program can be decrypted, re-encrypted, and stored in the media storage device as a cache to allow the user to pause, rewind, fast forward or any other functions that might be incorporated as part of trick play functions.

If a media storage device 528 is available to the IRD 132 and the data is to be stored on the hard disk prior to purchase for later purchase and playback, the IRD 132 bypasses CAM 406 processing and sends the encrypted program material 506 and associated CWP 504 directly to an encryptor engine 512 (typically included within the transport chip) and bypass being processed by the CAM. Once the data is further encrypted, the information is stored.

The present invention uses metadata associated with each media program that is included in the broadcast data stream. The metadata includes information describing the rights available to the subscriber 110 in terms of viewing and/or copying the program material. The "rights" associated with the program material could be presented to the subscriber 110 in a user-friendly manner.

The "rights" described in the metadata may allow the subscriber to view a media program an unlimited number of times within a time period (video store model); a set number of times within a time period (modified video store model); allow the user only one play within a set time period (movie theater model); and allow different pricing models for the different views (i.e. pay 1× for the first usage, ½× for second viewing, etc.). Other models would allow storage of media programs for set availability windows and then automatically delete the programs after the availability window is closed. Because the access control information as well as the associated program material, the present invention can be effectively utilized in systems in which the access control information is time-varying.

Typically, the IRD 132 handles the generation, encryption, and decryption of the encryption keys. The IRD 132 also includes the necessary hardware and software to install and restore keys for copy protected service.

While the foregoing description has focused primarily on the storage and retrieval of video programs, the present invention is not limited to these media types. As such, the terms "media program" or "program material" describe a video data stream, and/or an audio data stream, and/or any other broadcast data stream, regardless of the data type.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of storing program material for subsequent replay, comprising the steps of:
   receiving encrypted access control information and encrypted program material, the encrypted program material being encrypted according to a first encryption key, and the access control information including the first encryption key and control data;
   further encrypting the received encrypted access control information and the received encrypted program material according to a second encryption key;
   encrypting the second encryption key according to a third encryption key to produce a fourth encryption key; and
   storing the encrypted access control information and encrypted program material and the fourth encryption key.

2. The method of claim 1, further comprising the steps of:
   reading the further encrypted access control information and the further encrypted program material and the fourth encryption key;
   decrypting the fourth encryption key using the third encryption key to produce the second encryption key;
   decrypting the further encrypted program material using the second encryption key to produce the encrypted program material;
   decrypting the further encrypted access control information using the second encryption key to produce the encrypted access control information;
   decrypting the encrypted access control information to produce the first encryption key; and
   decrypting the program material using the first encryption key.

3. The method of claim 2, wherein
   the access control information further comprises data describing a right associated with the program material; and
   the steps of decrypting the encrypted access control information to produce the first encryption key and decrypting the program material using the first encryption key is performed according to the data describing the right.

4. The method of claim 3, wherein the right is expressed in a metadata table.

5. The method of claim 4, wherein the metadata table comprises data selected from the group comprising:
   at least one default value wherein the data describing a right associated with the program material comprises a change to at least one of the default values; and
   at least one control value expressing a condition that must be satisfied before pre-cached program material is presented to the subscriber.

6. The method of claim 3, wherein the right is selected from the group comprising:
   a storage right;
   a viewing right, having at least one viewing right characteristic selected from the group comprising:
      a non-purchase lifetime of the program material;
      a lifetime of the program material after a purchase of the program material;
      a number of permitted views per purchase of the program material;
      a cost to repurchase the program material; and a number of permitted views per repurchase of the program material.

7. The method of claim 2, further comprising the step of providing the decrypted program material to a presentation device.

8. The method of claim 2, further comprising the steps of:
   storing the decrypted program material; and
   reading the decrypted program material according to a user command.

9. The method of claim 8, wherein the user command is selected from the group comprising:
   a play command;
   a rewind command;
   a fast forward command;
   a fast reverse play command;
   a fast forward play command;
   a pause command;
   a frame step command; and
   a stop command.

10. The method of claim 2, further comprising the steps of:
    re-encrypting the decrypted program material according to the second encryption key;
    encrypting the second encryption key according to a third encryption key to produce a fourth encryption key; and
    storing the re-encrypted program material and the fourth encryption key.

11. The method of claim 10, wherein:
    the access control information further comprises data describing viewing rights for the program material; and
    the steps of decrypting the encrypted access control information to produce the first encryption key and decrypting the program material using the first encryption key is performed according to the data describing the viewing rights.

12. The method of claim 11, further comprising the steps of:
    reading the re-encrypted program material and the fourth encryption key;
    decrypting the fourth encryption key with the third key to produce the second encryption key; and
    decrypting the program material using the second encryption key.

13. The method of claim 12, further comprising the step of providing the decrypted program material to a presentation device.

14. The method of claim 12, wherein the steps of reading the re-encrypted program material and the fourth encryption key, decrypting the fourth encryption key with the third encryption key to produce the second encryption key, and decrypting the program material using the second encryption key are performed according to a user command.

15. The method of claim 14, wherein the user command is selected from the group comprising:
    a play command;
    a rewind command;
    a fast forward command;
    a fast reverse play command;
    a fast forward play command;
    a pause command;

a frame step command; and a stop command.

16. An apparatus for storing program material for subsequent replay, comprising:

a tuner, for receiving encrypted access control information and the program material encrypted according to a first encryption key, the access control information including the first encryption key and control data;

a first encryption module, communicatively coupled to the tuner and communicatively coupleable to a data storage device, the first encryption module for further encrypting the encrypted program material and the access control information according to a second encryption key;

a second encryption module, communicatively coupled to the first encryption module and communicatively coupleable to the data storage device, the second encryption module for encrypting the second encryption key according to a third encryption key to produce a fourth encryption key;

a first decryption module, communicatively coupleable to the disk drive, for decrypting the fourth encryption key to produce the second encryption key;

a second decryption module, communicatively coupled to the first decryption module and the tuner and communicatively coupleable to the data storage device, for decrypting the further encrypted program material to produce the encrypted program material and the encrypted access control information using the second encryption key;

a conditional access module, communicatively coupleable to the second decryption module and the tuner, for selectably accepting the access control information selected from the group comprising the access control information received in the tuner and the access control information decrypted by the second decryption module, the conditional access module comprising a third decryption module for decrypting the encrypted access control information to produce the first encryption key; and a module for decrypting the encrypted program material to produce unencrypted program material using the first encryption key.

17. The apparatus of claim 16, further comprising:

a third encryption module, communicatively coupled to the fourth decryption module and communicatively coupleable to a second media storage device, the third encryption module for encrypting the unencrypted program material according to the second encryption key; and a fifth decryption module, communicatively coupleable to the second media storage device, for decrypting the encrypted program material using the second encryption key.

18. The apparatus of claim 17, wherein the third encryption module encrypts the unencrypted program material and provides the encrypted program material to the data storage device when a subscriber selects a trick play operation.

19. The apparatus of claim 17, wherein the third encryption module encrypts the unencrypted program material and provides the encrypted program material to the data storage device when the subscriber purchases the program material.

20. The apparatus of claim 16, wherein:

the fourth decryption module is communicatively coupled to the first encryption module; and the second decryption module is communicatively coupleable to a presentation device.

21. The apparatus of claim 20, wherein:

the first encryption module encrypts the unencrypted program material using the second encryption key, and provides the encrypted program material to the data storage device; and the second decryption module accepts the encrypted program material from the data storage device and decrypts the encrypted program material using the second encryption key.

22. The apparatus of claim 16, further comprising the data storage device, for storing and retrieving the further encrypted program materials and the fourth encryption key.

23. The apparatus of claim 16, wherein the third decryption module is implemented in a smartcard.

24. The apparatus of claim 16, wherein the control data is temporally variant.

25. An apparatus for storing program material for subsequent replay, comprising:

means for receiving encrypted access control information and encrypted program material, the encrypted program material being encrypted according to a first encryption key, and the access control information including the first encryption key and control data;

means for further encrypting the received encrypted access control information and the received encrypted program material according to a second encryption key;

means for encrypting the second encryption key according to a third encryption key to produce a fourth encryption key; and means for storing the encrypted access control information and encrypted program material and the fourth encryption key.

26. The apparatus of claim 25, further comprising:

means for retrieving the further encrypted access control information and encrypted program material and the fourth encryption key;

means for decrypting the fourth encryption key using the third encryption key to produce the second encryption key;

means for decrypting the further encrypted program material using the second encryption key to produce the encrypted program material;

means for decrypting the further encrypted access control information using the second encryption key to produce the encrypted access control information;

means for decrypting the encrypted access control information to produce the first encryption key; and means for decrypting the program material using the first encryption key.

27. The apparatus of claim 26, wherein:

the access control information further comprises data describing at least one right for the program material; and encrypted access control information the encrypted program material is decrypted according to the data describing the right.

28. The apparatus of claim 27, wherein the right is selected from the group comprising:

a storage right;

a viewing right, having at least one viewing right characteristic selected from the group comprising:

a non-purchase lifetime of the program material;

a lifetime of the program material after a purchase of the program material;

a number of permitted views per purchase of the program material;

a cost to repurchase the program material; and a number of permitted views per repurchase of the program material.

29. The apparatus of claim 26, further comprising means for providing the decrypted program material to a presentation device.

30. The apparatus of claim 26, further comprising:

means for storing the decrypted program material; and means for retrieving the decrypted program material according to a user command.

31. The apparatus of claim 30, wherein the user command is selected from the group comprising:

a play command;

a rewind command;

a fast forward command;

a fast reverse play command;

a fast forward play command;

a pause command;

a frame step command; and a stop command.

32. The apparatus of claim 26, further comprising:

means for re-encrypting the decrypted program material according to the second encryption key;

means for encrypting the second encryption key according to a third encryption key to produce a fourth encryption key; and means for storing the re-encrypted program material and the fourth encryption key.

33. The apparatus of claim 32, wherein:

the access control information further comprises data describing at least one right for the program material; and encrypted access control information the encrypted program material is decrypted according to the data describing the right.

34. The apparatus of claim 33, further comprising:

means for reading the re-encrypted program material and the fourth encryption key;

means for decrypting the fourth encryption key with the third key to produce the second encryption key; and means for decrypting the program material using the second encryption key.

35. The apparatus of claim 34, further comprising means for providing the decrypted program material to a presentation device.

36. The apparatus of claim 34, wherein the re-encrypted program material and the fourth encryption key is read, the fourth decryption key is decrypted with the third key to produce the second encryption key, and the program material is decrypted using the second decryption key according to a user command.

37. The apparatus of claim 36, wherein the user command is selected from the group comprising:

a play command;

a rewind command;

a fast forward command;

a fast reverse play command;

a fast forward play command;

a pause command;

a frame step command; and a stop command.

* * * * *